(12) United States Patent
Adams et al.

(10) Patent No.: US 8,117,824 B1
(45) Date of Patent: Feb. 21, 2012

(54) POLLUTION FREE ENGINE USING HYDROGEN AS A FUEL

(75) Inventors: Richard Adams, Chula Vista, CA (US); Carol A. Becker, Del Mar, CA (US)

(73) Assignee: The United States of America as represented by the Secterary of the Navy, Washington, DC (US)

(*) Notice: Subject to any disclaimer, the term of this patent is extended or adjusted under 35 U.S.C. 154(b) by 651 days.

(21) Appl. No.: 12/365,211

(22) Filed: Feb. 4, 2009

(51) Int. Cl.
- *F02C 5/02* (2006.01)
- *F02C 3/14* (2006.01)
- *C07C 1/00* (2006.01)
- *B05D 7/00* (2006.01)

(52) U.S. Cl. .................. 60/39.34; 60/39.35; 60/39.465; 204/157.15; 427/419.1

(58) Field of Classification Search .................. 60/39.34, 60/39.35, 39.465; 123/202, 247, 658; 95/56; 416/20, 21 R
See application file for complete search history.

(56) References Cited

U.S. PATENT DOCUMENTS

| | | | | |
|---|---|---|---|---|
| 2,544,420 A | * | 3/1951 | Goddard | 60/39.35 |
| 3,145,533 A | * | 8/1964 | Ollinger | 60/39.34 |
| 4,229,938 A | * | 10/1980 | Gallagher | 60/39.34 |
| 4,706,452 A | * | 11/1987 | Lavoie | 60/39.35 |
| 5,560,196 A | * | 10/1996 | Schlote | 60/39.35 |
| 7,073,319 B1 | * | 7/2006 | Rhyne | 60/39.35 |
| 7,727,596 B2 | * | 6/2010 | Ma et al. | 427/419.1 |
| 8,048,274 B2 | * | 11/2011 | Brooks et al. | 204/157.15 |

* cited by examiner

*Primary Examiner* — Louis Casaregola
*Assistant Examiner* — Arun Goyal
(74) *Attorney, Agent, or Firm* — Arthur K. Samora; Kyle Eppele

(57) ABSTRACT

A pollution-free propulsion engine includes a rotating arm, a hollow axle defining a fuel delivery chamber, and hydrogen and oxygen sources. The rotating arm is formed with a detonation chamber, an opening and two tubular ducts therebetween. The axle is inserted into the opening. A pair of holes is formed in the axle to establish paths of fluid communication from the fuel delivery chamber through the ducts and into the detonation chamber as the rotating arm turns. The hydrogen source comprises a thin palladium binding layer deposited onto an aluminum sheet. Hydrogen molecules that are trapped in the binding layer are released, and the hydrogen is fed into the delivery chamber, through one duct and into the detonation chamber. At the same time, oxygen is delivered into the detonation chamber through the other duct, and the oxygen-hydrogen combination is detonated to release energy, which is converted into mechanical energy.

10 Claims, 8 Drawing Sheets

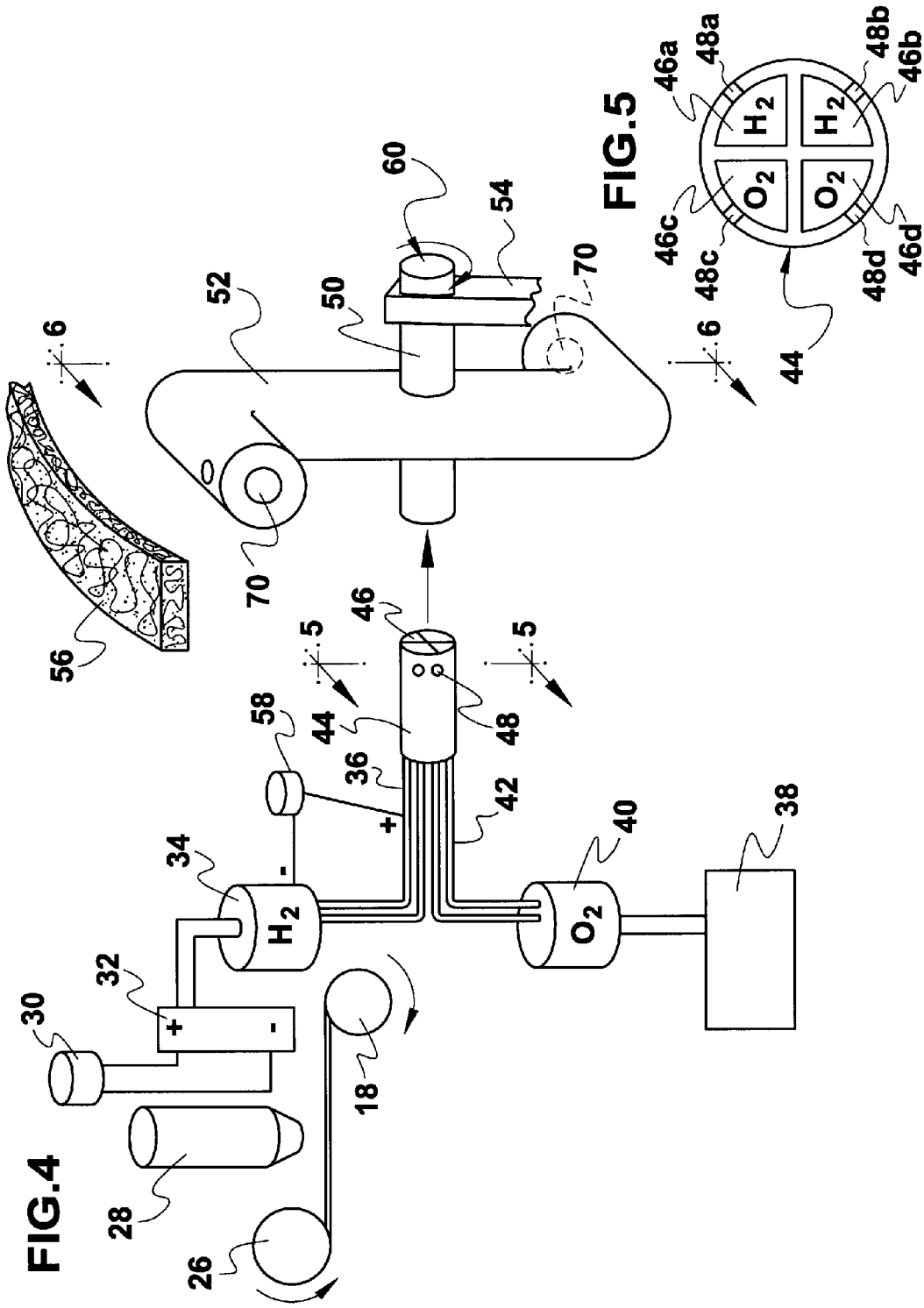

POLLUTION FREE ENGINE USING HYDROGEN AS A FUEL

FEDERALLY-SPONSORED RESEARCH AND DEVELOPMENT

This invention (Navy Case No. 099416) is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice 619-553-2778; email T2@spawar.navy.mil.

FIELD OF THE INVENTION

This disclosure relates to vehicle propulsion systems. More particularly, this disclosure relates to vehicle propulsion systems that use hydrogen as a fuel in order to propel vehicles in a pollution-free manner.

BACKGROUND OF THE INVENTION

Many vehicles are currently powered by petroleum-based fuels. The use of such vehicles and such fuels can be disadvantageous for several reasons. First, petroleum-based fuel can generate a relatively large amount of by-products from combustion (exhaust). The exhaust by-products generate greenhouse gases and pollution, which are profoundly changing and damaging the earth's environment. One pollution-free source of energy is solar energy, but currently available forms of solar energy cannot be readily adapted for vehicle propulsion systems.

Additionally, petroleum resources that are needed for such vehicles are sometimes controlled by politically unstable regimes that are inimical to the United States.

In addition to the considerations listed above, most vehicles that use petroleum-based fuels are mechanically inefficient, because most of these vehicles have a propulsion system which requires the conversion of linear mechanical energy from the engine pistons to rotational energy to drive the vehicle wheels. Because such engines have so many moving parts, much of the energy is used in overcoming frictional forces in the engine itself. As a result, more energy per unit mass is required to propel the vehicle, which results in more petroleum-based fuels being consumed, which further results in more harmful combustion by-products being released into the environment. What is desired is a propulsion system that runs on an alternative fuel, and one that moves in a rotary manner in the direction of the axle, in order to significantly increase the engine efficiency.

In view of the above, an object of the present invention is to provide a propulsion system with a minimum of major moving parts. It is another object of the present invention to provide a propulsion system that uses fuel that can be made readily available in many countries throughout the world. Yet another object of the present invention is to provide a propulsion system that yields liquid water as its exhaust product. A further object of the present invention is to provide a propulsion system that can be easily manufactured in a cost-efficient manner.

SUMMARY OF THE INVENTION

A pollution-free propulsion system includes an arm that rotates around a hollow axle. The rotating arm is formed with a detonation chamber at each end, an opening in the middle and at least one pair of tubular ducts therebetween to establish a path of fluid communication between the detonation chamber and the opening. An alternative is to have only one detonation chamber at the end of the arm and to locate the opening at the other end. The axle is inserted into the opening to establish an axis of rotation for the rotating arm around the axle. The axle can be cylindrical and defines a fuel delivery chamber. At least one pair of holes (Note: this sentence covers the case of four holes while allowing other numbers) is formed in the axle to selectively establish a path of fluid communication between the fuel delivery chamber of the axle and the detonation chamber in the rotating arm. This periodically occurs when said ducts in the rotating arm align with the holes in the axle as the rotating arm turns about the axle.

The propulsion system can further include a hydrogen storage container in fluid communication with the fuel delivery chamber in the axle. The hydrogen storage container receives its hydrogen from a hydrogen source. The hydrogen source can include a binding layer of hydrogen-absorbing metal deposited on a continuous sheet of aluminum foil. The binding layer is deposited onto the aluminum sheet and the sheet is passed through a container of hydrogen gas. The sheet is then rolled up into a delivery roll for future use in accordance with several embodiments of the present invention. The binding layer can be made of zirconium or palladium, although other materials with similar properties could be used.

During operation of the propulsion system, the aluminum foil is unrolled and a voltage that is precisely determined to ionize the hydrogen molecules in the binding layer is applied to the aluminum foil. The ionized hydrogen molecules are then extracted from the binding layer by an applied electric field and are collected in a hydrogen storage container. Hydrogen is delivered from the storage container into the fuel delivery chamber in the axle, and further through the rotating arm duct into the detonation chamber when the rotating arm rotates about the axle as described above. At the same time, oxygen is delivered through the axle into the detonation chamber, and the oxygen-hydrogen combination is detonated to release chemical energy, which is converted into rotational mechanical energy.

For the methods according to several embodiments of the present invention, hydrogen can be safely stored in a stable manner through the use of a binding layer on a sheet of aluminum foil, as described above. The methods can further include the steps of separating the hydrogen from the aluminum foil through the use of an electron beam or a laser, and the step of collecting of the hydrogen in a hydrogen storage container.

The methods can further include the steps of delivering hydrogen and importing oxygen into the engine detonation chamber. As the oxygen and hydrogen mixture is detonated, the resulting chemical energy is converted into rotational mechanical energy. The resulting by-product of the detonation is water vapor which condenses and can be collected.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which:

FIG. 4 is an exploded side elevational view of the propulsion system according to several embodiments of the present invention;

FIG. 5 is a cross-sectional view taken along line 5-5 in FIG. 4;

DETAILED WRITTEN DESCRIPTION OF THE EMBODIMENTS

Figure 1:
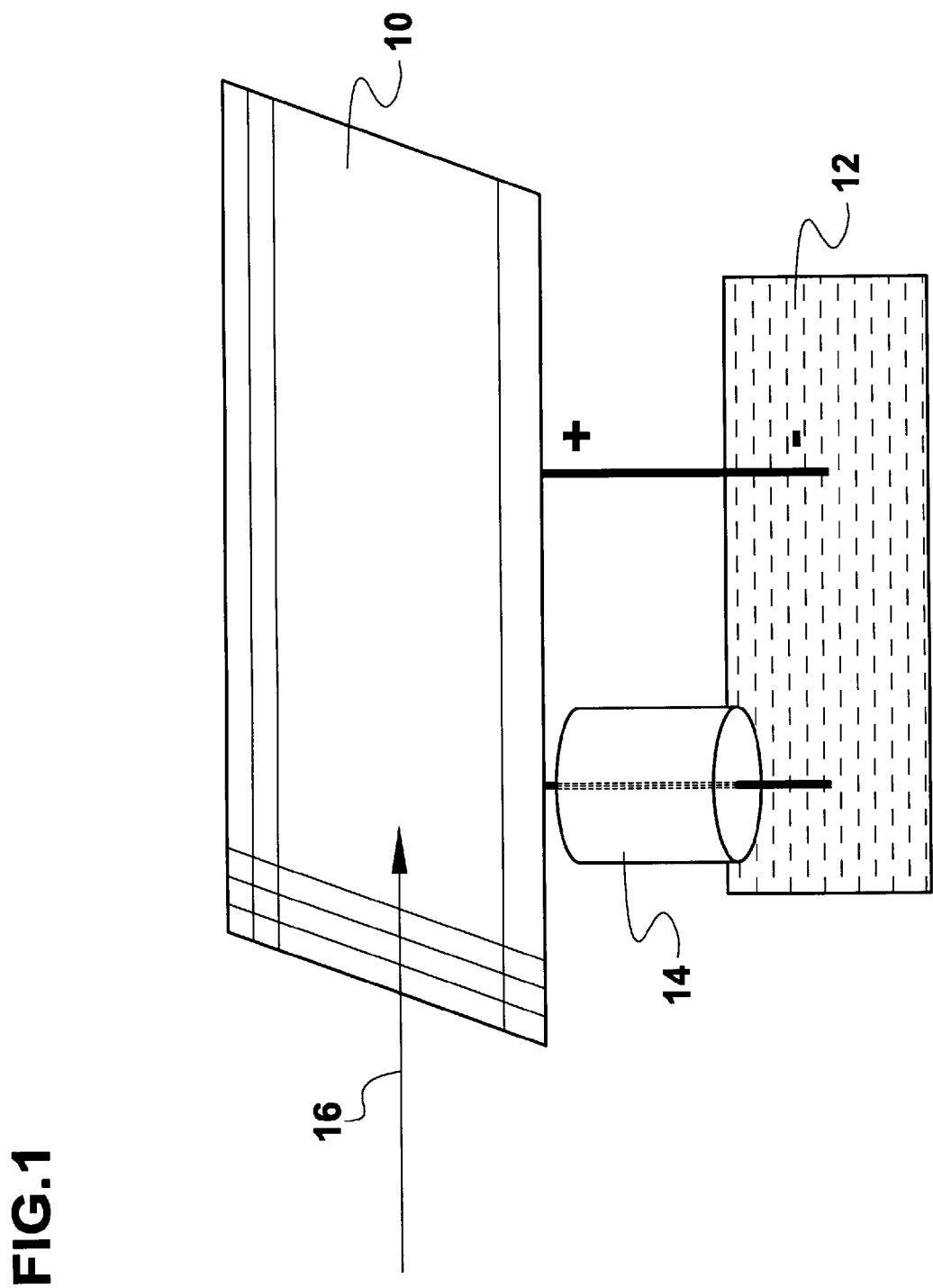
FIG. 1 is a block diagram that illustrates the electrolysis of sea water to yield hydrogen for further use in the propulsion system according to several embodiments of the present invention.

Referring initially to FIG. 1, FIG. 1 presents an exemplary method of generating hydrogen for use as fuel. As shown, a solar cell 10 that is powered by sunlight 16 can be used to apply a voltage difference to seawater 12, in order to extract hydrogen from sea water in a manner known in the prior art. This electricity can electrolyze the salt water to separate it into hydrogen and oxygen. The released hydrogen can collected in container 14 for further use as described hereinafter. The oxygen resulting from the electrolysis process can either be released to the atmosphere or used for separate purposes.

Figure 3:
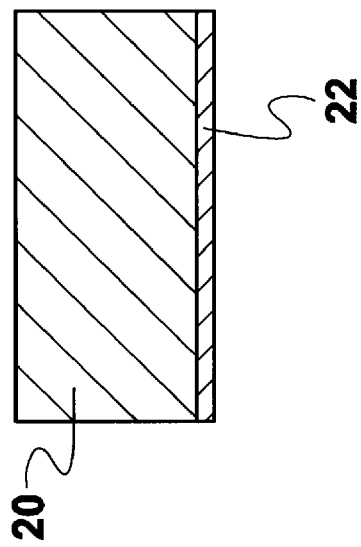
FIG. 3 is an enlarged cross-section view taken along the line 3-3 in FIG. 2.

Once liberated the hydrogen must be stored in a manner that allows for safe transport, until it is ready for use. Absorption could be used to bind the hydrogen to a metal layer so that it would not be flammable or otherwise dangerous. To do this, and referring now to FIGS. 2 and 3, hydrogen liberated from sea water to can be bound to a metal through the use of an electric field. More specifically, a roll 18 of aluminum strip 20 can be used. As can be seen in FIG. 3, roll 18 comprises aluminum strip 20 and a thin binding layer of hydrogen-absorbing metal 22 that is deposited onto aluminum strip 20. The binding layer 22 can be placed on only one side of substrate 20, or on both sides, as illustrated in FIG. 3.

For several embodiments of the present invention, zirconium or palladium can be used as the material for binding layer 22. The palladium layer would be deposited on a thin strip of a common metal such as aluminum. The aluminum can have a thickness of around 0.001 m and can be flexible enough to be rolled compactly. The width could be 0.10 m. Palladium is a metal that absorbs significant amounts of hydrogen gas; $10^{-3}$ kg of palladium can absorb up to $14 \times 10^{-6}$ kg of hydrogen gas.

Once the hydrogen is absorbed, when it is time to extract the hyrdrogen as discussed below, and assuming an extraction efficiency of 0.36, this means that for each gram of palladium, up to $5 \times 10^{-6}$ kg of hydrogen could be absorbed. The density of aluminum is 2700 kg/m$^3$. Since palladium has a density of 12023 kg/m$^3$, and using the widths and thicknesses for the strip 20 and layer 22 cited above, the length of 1 gram of palladium that holds $14 \times 10^{-6}$ kg of hydrogen is $8.3 \times 10^{-3}$ m. Thus, the length of the strip that contains enough hydrogen to supply $1.42 \times 10^9$ Joules (the energy released by 11.5 gallons of gasoline, which is sufficient to propel a Nissan Sentra for 430 miles) is 176 meters, and the radius of the roll of aluminum with a layer of palladium to supply this energy is approximately one-quarter of a meter.

Figure 2:
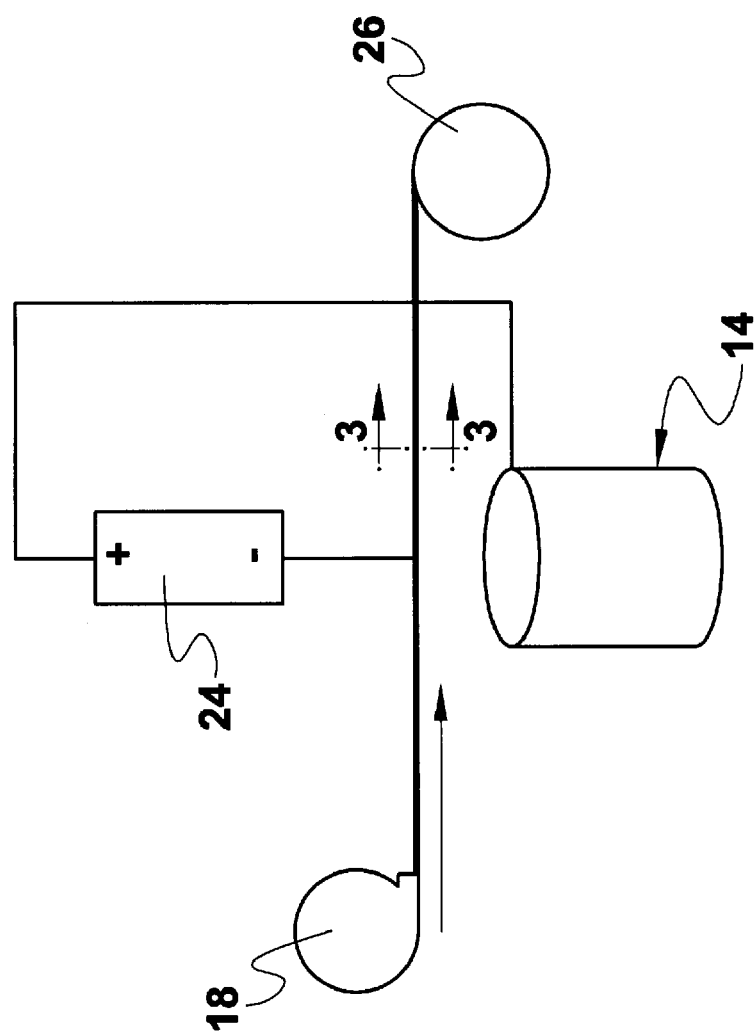
FIG. 2 is a block diagram that illustrates the binding of hydrogen to a thin layer or film of hydrogen-absorbing metal deposited onto an aluminum substrate for further use as fuel in the propulsion system according to several embodiments of the present invention.

To entrap the hydrogen molecules into the binding layer, and as shown in FIG. 2, a voltage source 24 can be used to supply a voltage difference between aluminum foil 18 and hydrogen container 14. The voltage difference would attract the hydrogen gas. The gas made by electrolysis is located below the layer of palladium. The hydrogen container 14 is placed below the foil to use the natural buoyancy of hydrogen, rather than oppose it. A voltage difference is applied between the palladium and the hydrogen gas as the aluminum foil is slowly passed over the hydrogen container 14. The voltage difference attracts the hydrogen molecules, which then adhere to the palladium binding layer 22. The use of palladium in the last sentence and subsequent sentences does not exclude other metals being used in a similar manner.

Over a period of time, a sufficient quantity of hydrogen would then get absorbed in the palladium binding layer. Once trapped in the metal, the hydrogen would not be flammable or otherwise toxic. The foil is then rolled up into a fuel roll 26. Once confined as described above, the hydrogen could distributed by means that are known in the prior art.

In order to be used as fuel for the engine according to several embodiments of the present invention, the absorbed hydrogen must be released from binding layer 22. To do this, and referring now to FIG. 4, an ionization source 28 such as a laser or an electron beam is provided. The laser can be tuned to the wavelength of ionization of the hydrogen molecules in the palladium, eighty nanometers (80 nm). The laser will liberate the electrons of many of the hydrogen molecules within its beam. The laser beam could have a spot size with radius $1.6 \times 10^{-2}$ m and be directed at aluminum foil 20 is fuel roll 26 is unrolled under the laser. The action of foil 20 from fuel roll 26 will be similar to tape inserted into a videotape player.

Instead of a laser, an electron beam could be used to ionize the hydrogen molecules. The ionization energy of electrons from a hydrogen molecule is 15.3 electronVolts (eV). That of an electron in the hydrogen atom is only 13.6 eV. Since almost all the hydrogen contained in binding layer 22 will be in molecular form, the former value applies. Electrons can be released from a filament by heating from a current. The electrons can be focused by a magnetic field and accelerated by an electric field so that the average energy is 15.3 eV. The electrons are assumed to enter a cylindrical chamber whose entrance has zero voltage. The electrons would then undergo a voltage drop of 15.3 V to have on average the correct energy. The electrons striking the hydrogen molecules in the metal would then ionize them. The ionized hydrogen would then be drawn out of the metal by an applied electric field. A voltage drop of 15.3 V is easily obtained. Focusing the beam need not be exact, merely enough to ensure that most of the electrons undergo a similar acceleration from the voltage difference.

Once the hydrogen molecules are ionized, an electric field from second voltage source 30 will draw the hydrogen molecules from the binding layer 22 towards acceleration tube 32. Similar to the action of a triode, the electric field accelerates the ions, most of which will pass through an acceleration tube 32 and into a fuel storage chamber 34.

Once the palladium binding layer 22 is depleted of readily available hydrogen, it can be re-used as an aluminum/palladium foil roll 18. The roll 18 may be re-used for absorbing hydrogen as described above.

A third voltage source 58 can attract the hydrogen ions from fuel storage chamber 34 through hydrogen feed tubes 36 and into axle 44. By referring to FIGS. 4 and 5, it can be seen that hydrogen fuel delivery chambers 46a and 46b are formed in axle 44. Voltage source 58 can be used to guide and accelerate the hydrogen molecules further through hydrogen feed tubes 36 and into fuel delivery chambers 46a and 46b. To ensure that voltage sources 30 and 58 do not work against each other, voltage sources 30, 58 can be timed so that one is energized while the other is de-energized. At the appropriate time, a plunger (not shown) or similar pressurization means can increase the pressure of the hydrogen gas in the fuel delivery chambers 46 by a factor of ten, or by a factor necessary to deliver the hydrogen into rotating arm 52 at a pressure that is sufficient for detonation, as discussed hereinafter.

The oxygen that is needed for operation of the engine according to several embodiments of the present invention can be obtained by separating the oxygen from the atmosphere. To do this, there are commercially available devices that are known in the prior art which remove nitrogen from the air (which essentially leaves oxygen). One such exemplary device is a commercial air scrubber 38 (used, for example, by patients in need of assistance in breathing), which can purify the air to deliver ten liters (10 l) of gas per minute that is ninety to ninety-five percent (90-95%) pure oxygen by weight, which is further sufficient for operation of the engine according to several embodiments of the present invention. The nearly pure oxygen can be sent to an oxygen collection chamber 40. When the oxygen is needed for operation of the engine, oxygen is delivered from oxygen collection chamber 40, through oxygen feed tubes 42 and into oxygen delivery chambers 46c and 46d that are formed in axle 44. As described above for hydrogen, a plunger (not shown) can be used increase the oxygen pressure by a factor that is selected according to user needs. This increase in pressure can force the oxygen into rotating arm 52 at sufficient pressure for detonation, as described more fully below.

As described above and illustrated in FIGS. 4 and 5, there can be a total of four delivery chambers 46, hydrogen delivery chambers 46a and 46b, and oxygen delivery chambers 46c and 46d, that can be formed in axle 44. The axle 44 is further formed with holes 48a, 48b, 48c and 48d that correspond to respective fuel delivery chambers 46a, 46b, 46c and 46d (shown in FIG. 5) through which the hydrogen and oxygen will exit the chambers 46 and enter rotating arm 52 as described below. The rotating arm 52 can be formed with a sleeve 50 that defines an opening 60. The sleeve and rotating arm 52 can be formed as an integral unit, or the sleeve can be manufactured separately and fastened to rotating arm.

Figure 6:
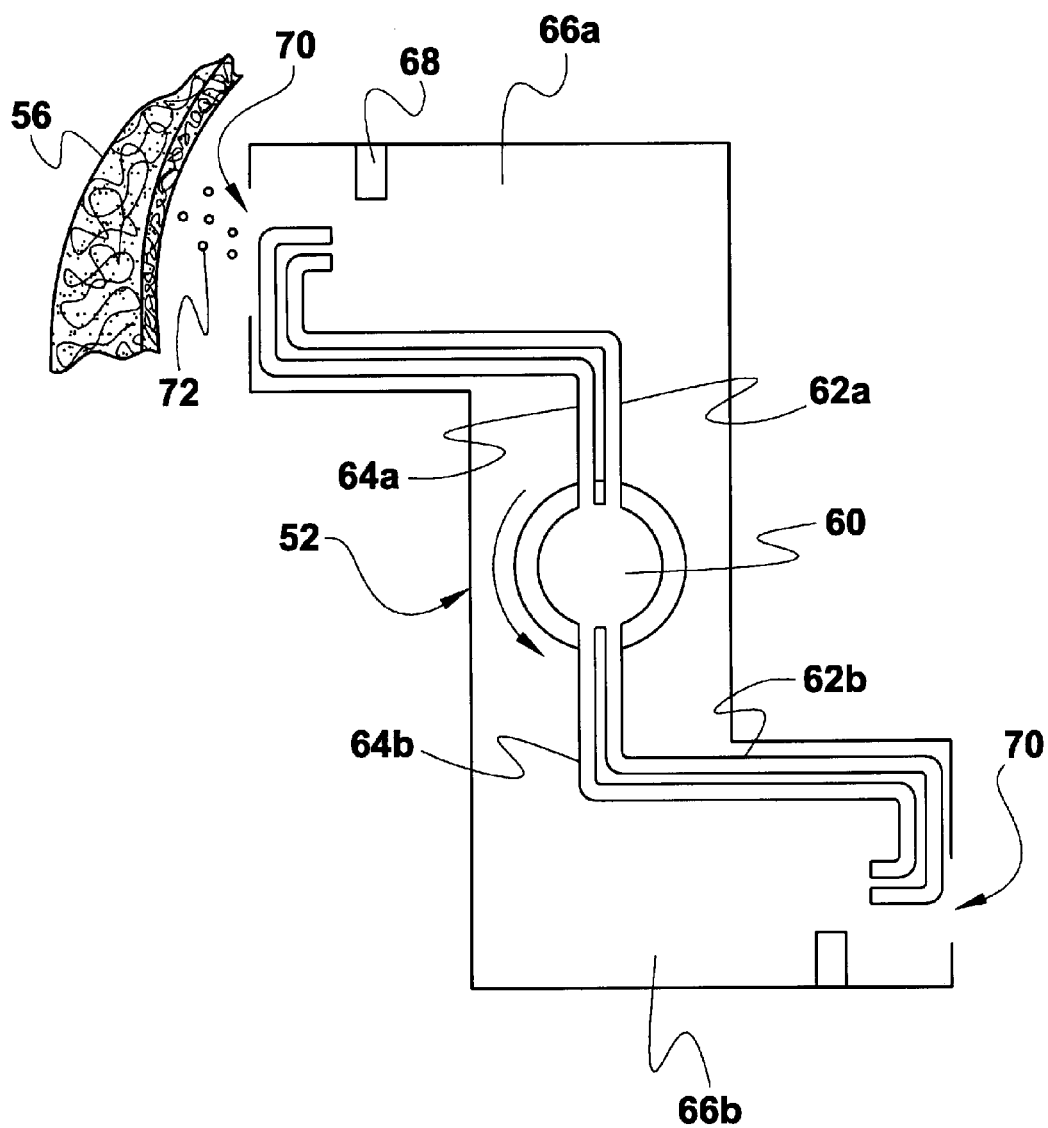
FIG. 6 is a cross-section view taken along line 6-6 in FIG. 4.
Figure 7:
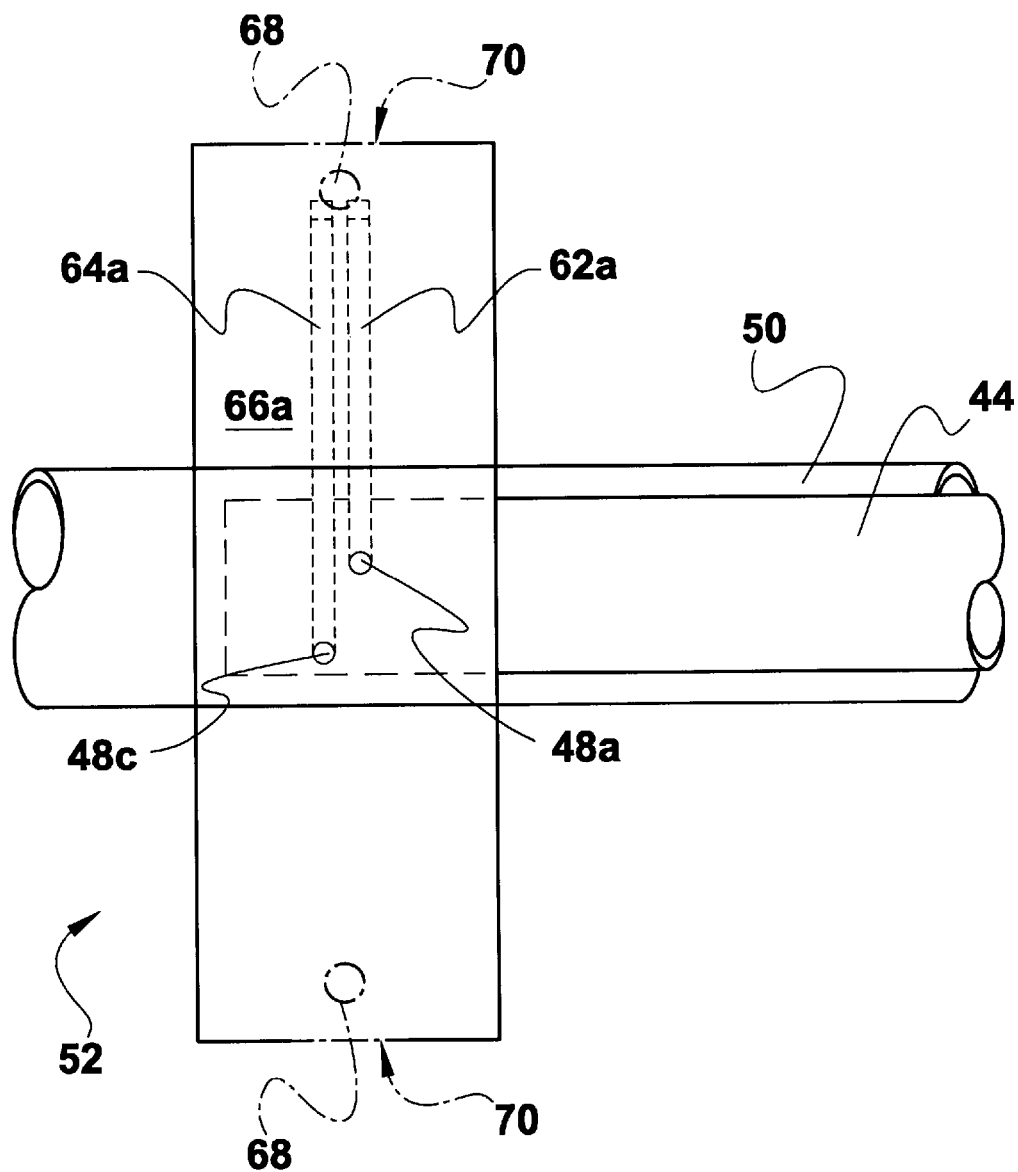
FIG. 7 is a top plan view of the rotating arm for the system shown in FIG. 4, with the rotating arm at the twelve o'clock position, and with the several of the ducts that are formed in the rotating arm shown in phantom.

Referring now to FIGS. 6-9, the structure of rotating arm 52 is shown in greater detail. The rotating arm 52 is the main moving part of the engine and can be formed with four ducts 62, 64 in its interior. More specifically, and as shown in FIGS. 6-7, the rotating arm is formed with at least one hydrogen duct 62 (FIG. 6 illustrates two hydrogen ducts 62a and 62b) in the rotating arm. The duct can be formed integral to the rotating arm, or it can be manufactured via tubing of suitable materials and then inserted into the rotating arm. The duct 62 establishes a path of fluid communication between opening 60 in sleeve 50 and detonation chambers 66. In FIG. 6, hydrogen duct 62a establishes a fluid communication between opening 60 and detonation chamber 66a, while hydrogen duct 62b establishes a fluid communication path between opening 60 and detonation chamber 62b. In similar fashion, oxygen ducts 64a and 64b establish a path of fluid communication between opening 60 and respective detonation chambers 66a, 66b.

Figure 8:
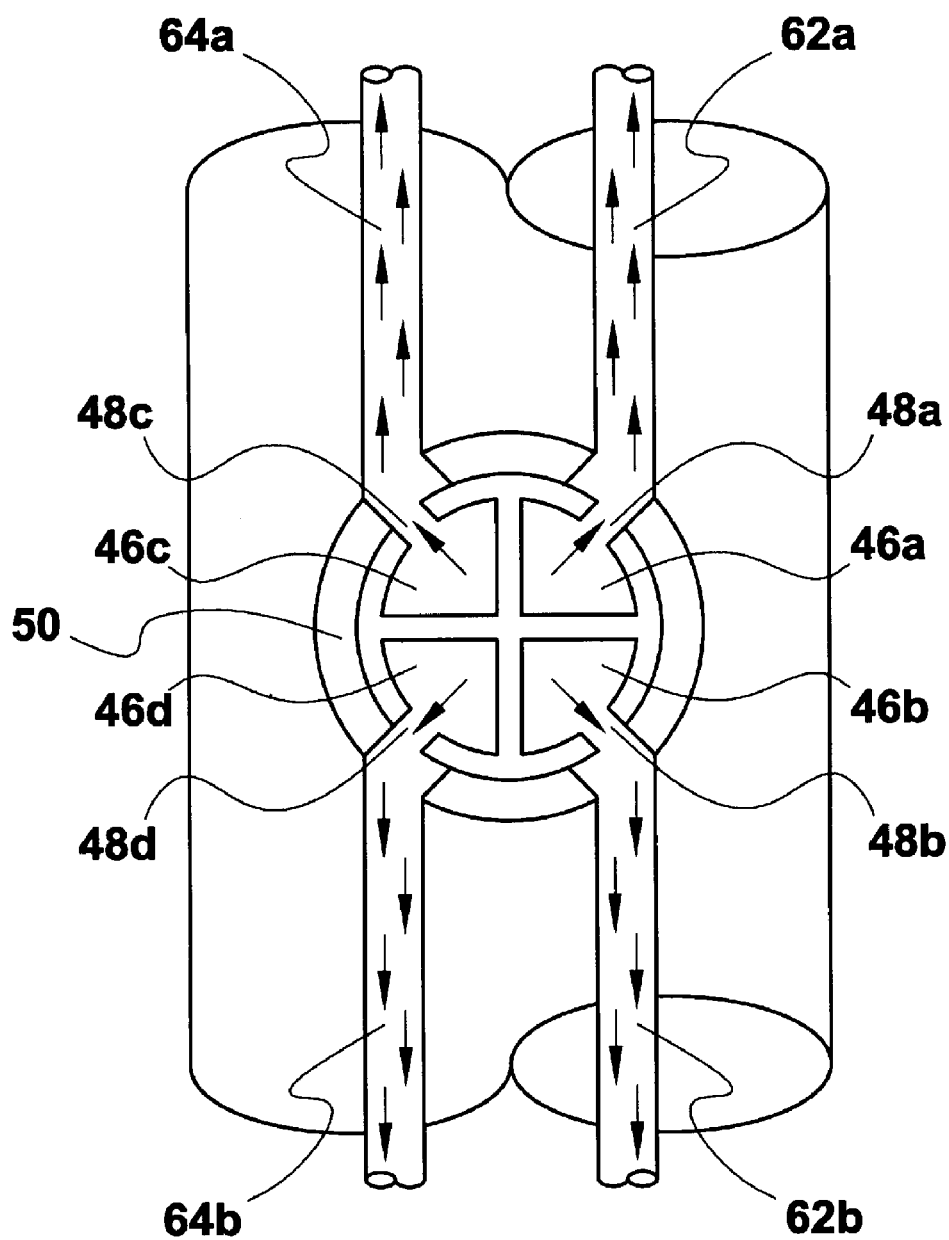
FIG. 8 is the same view as FIG. 6, but further illustrates the fluid communication path of hydrogen and oxygen from chambers in the axle into the rotating arm ducts (and further into the detonation chamber) when the rotating arm is disposed around the axle and the arm ducts are aligned with the axle.
Figure 9:
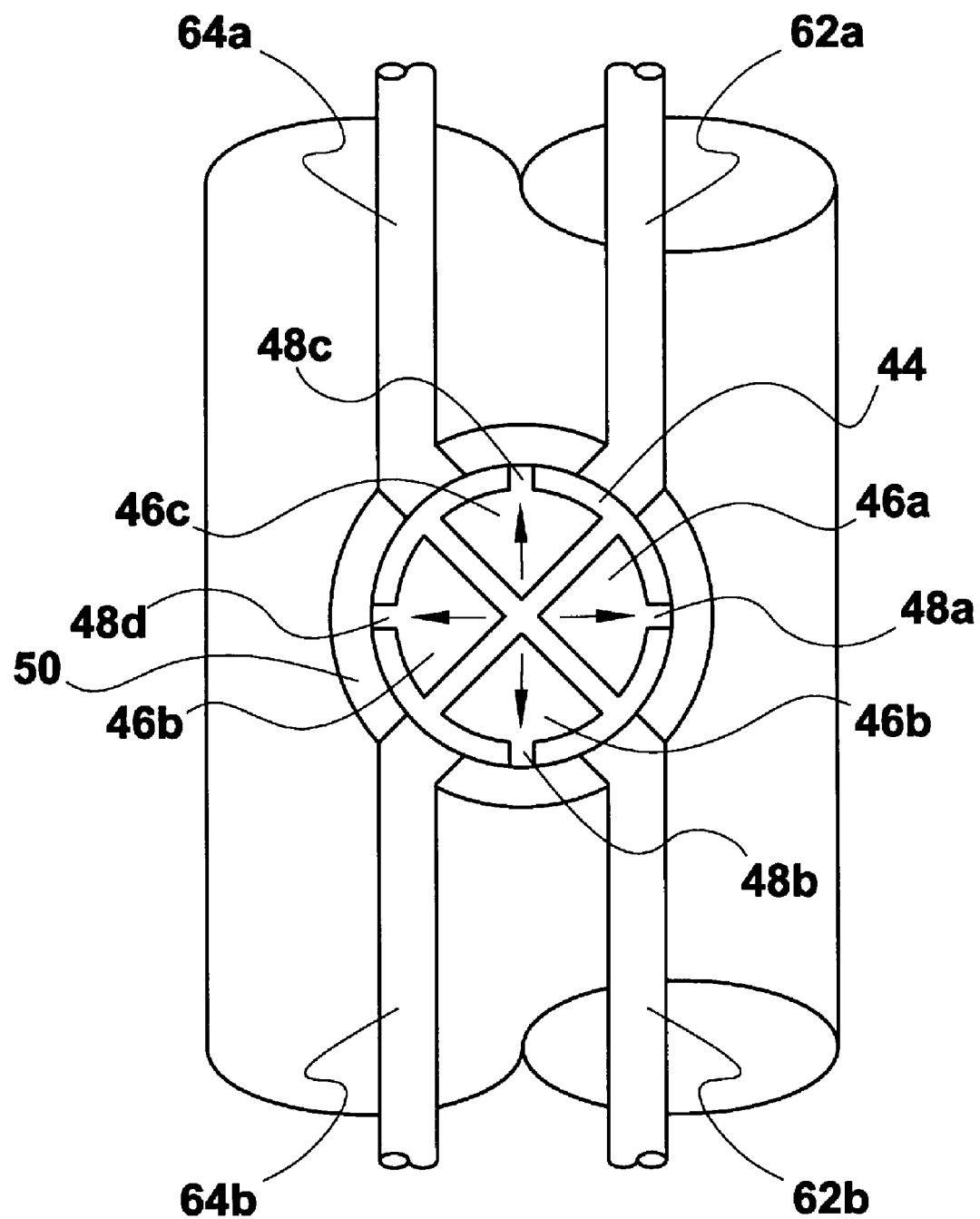
FIG. 9 is the same view as FIG. 8, but when the ducts in the rotating arm not aligned with the holes in the axles; and, FIG. 10 is a block diagram which can illustrate the steps of the methods according to several embodiments of the present invention.

Once axle 44 is inserted into sleeve 50 for operation, the sleeve 50 can block the gases from entering the ducts 62, 64 in rotating arm 52 when the holes 48 in axle 44 are not aligned with ducts 62, 64 in axle. This configuration is shown in FIG. 9. However, when holes 48 in axle 44 can become aligned with ducts 62, and 64 in axle 44, as shown in FIG. 8 as the arm 52 rotates around axle 44. When this occurs, a path of fluid communication becomes established from hydrogen delivery chamber 46a through hole 48a and hydrogen duct 62a, and detonation chamber 66a. Similarly, a path of fluid communication can become established form oxygen delivery chamber 46c, through hole 48c and oxygen duct 64a and into detonation chamber 66a. Similar paths of fluid communication can be established between hydrogen and oxygen delivery chambers 46b, 46d and detonation chamber 66b. In this manner, hydrogen and oxygen gases can be delivered into detonation chambers 66a, 66b under pressure and mix. The oxygen and hydrogen mix rapidly due to the turbulence created by the motion.

There is a range of pressure and temperature at which hydrogen and oxygen detonates rather than combusts. The hydrogen and oxygen is delivered to the detonation chamber 66 at a pressure and temperature that favors detonation vice combustion when the mixture is ignited. Each detonation chamber can include a spark plug 68 that is selectively ignited to detonate the hydrogen/oxygen gas mixture in the detonation chamber. A typical time scale for the completion of the ignition is $1 \times 10^{-6}$ seconds.

The detonation of the hydrogen and oxygen mixture will be explosive in character. Under certain conditions of pressure and temperature, the explosion will form a shock wave. The shock wave will propagate toward the closed end of each chamber. The shock wave leaves in its wake a highly compressed gas that moves at a speed greater than the speed of sound. Both the shock and the wake import a significant amount of momentum to the closed end of detonation chamber 66. From the Huguenot relations and the assumed adiabatic index of hydrogen (gamma=1.4 due to the diatomic character of both hydrogen and oxygen), the fluid in the wake of the shock most likely moves at a speed 5/6 of the speed of the shock. Because the chambers are at the end of arms at whose center is an axis, the momentum imposed upon detonation chambers 66 will start or accelerate rapid rotation of rotation arm 52.

It is possible that there will be instabilities in the front of the shock wave, but any instability probably will not form rapidly enough before the detonation wave hits the end of the cylindrical chambers. Momentum will be transferred to rotating arm 52 to cause rotation in one direction. Expulsion of the water vapor out the open end of the detonation chamber adds to the momentum transferred to the arm.

Detonation of the hydrogen and oxygen mixture in detonation chamber 66 as described above can cause water vapor by-products. The water vapor that moves in the direction of the closed end of the cylindrical chamber will be reflected. The motion of the rotating arm 52 will cause water vapor droplets 72 to exit the detonation chambers 66 at exhaust opening 70. The explosion of hydrogen and oxygen can be timed (by manipulating the timing of spark plug 68) so that 99% of the water vapor exits detonation chamber 66 before the next detonation.

FIGS. 4 and 6 present a description of the collection of exhaust products (e.g., water vapor). Water vapor should not be allowed to exit the engine. Water vapor is a greenhouse gas. A mesh screen 56 will permit water vapor to exit the engine. The water vapor will meet stationary cooling coils (not shown). The water vapor will condense. The screen will prevent the water droplets that have exited detonation chamber 66 through exhaust opening 70 from re-entering the detonation chamber 66. The droplets 72 will fall to the bottom of mesh 56, where they can be collected for easy disposal at periodic intervals.

One method of transferring angular momentum from the rotating arm 52 to the vehicle (not shown) is via a fan belt 54 that is mounted to sleeve 50, as shown in FIG. 4. A belt offers some advantages. A belt would allow the engine to be located some distance away from the place where the energy is applied. Certainly a belt will be needed to drive an electric generator for electricity to run various devices such as lights, the laser for hydrogen extraction, climate control, an electric engine for driving in reverse, or a radio, for example.

Figure 10:
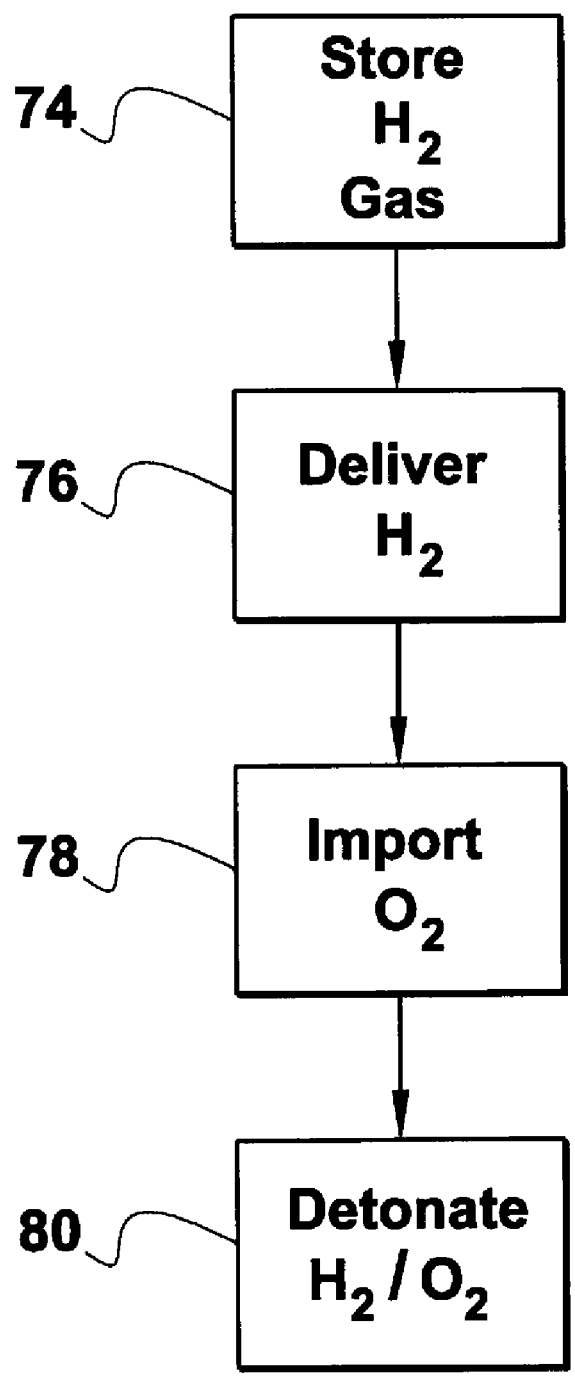

Referring now to FIG. 10, a block diagram showing the steps according to several methods of the present invention is shown. As shown, the initial step indicated by block 74 involves storing hydrogen gas for future delivery into the engine. To do this in a stable and easy-to-transport fashion, the hydrogen is absorbed into a thin binding layer 22 of hydrogen-absorbing metal deposited on a continuous aluminum foil strip 20.

The next step (block 76) can include delivering the hydrogen into the engine. This is further accomplished by using the laser or electron beam as described above to ionize the hydrogen molecules in the binding layer 22, and the use of at least one voltage source to extract the hydrogen from the binding layer and accelerate it into the hydrogen delivery chambers 46 in axle 44. The methods further include importing oxygen into the oxygen delivery chambers 46c, 46d, as indicated by block 78. As also described above, this is accomplished through the use of a commercial scrubber. Once in delivery chambers 46, the hydrogen and oxygen are pressurized.

As arm 52 rotates around the axle 44, the hydrogen ducts 62 and oxygen ducts 64 become periodically aligned in the holes 48 in the axle as described above. When this occurs, the aforementioned path of fluid communication is established, and the hydrogen and oxygen (which are under pressure) flow separately from axle 44 into the rotating arm ducts, the respective hydrogen and oxygen ducts 62, 64 and into detonation chambers 66. Once this occurs, the methods according to several embodiments of the present invention include the step of detonating the hydrogen/oxygen mixture, as indicated by block 80 in FIG. 10. The detonation releases chemical energy that is converted into rotational mechanical energy as described above.

All the major components that come in contact with oxygen should be made of stainless steel. Although a number of commonly available metals can resist the corrosive effects of oxygen, stainless steel is widely used for many purposes for which corrosion resistance is necessary.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A propulsion system comprising:
    a rotating arm formed with a detonation chamber at one end and an opening at the other end;
    said rotating arm having a first duct and a second duct formed therein to establish respective paths of fluid communication between said detonation chamber and said opening; and
    an axle inserted into said opening to establish an axis of rotation for said rotating arm around said axle, said axle defining a fuel delivery chamber; and,
    said axle having at least one pair of holes to selectively establish a path of fluid communication between said fuel delivery chamber and said detonation chamber when said first duct and said second duct align with respective said holes as said rotating arm rotates around said axle.

2. The propulsion system of claim 1 further comprising a hydrogen storage container in fluid communication with said fuel delivery chamber.

3. The propulsion system of claim 2 further comprising a hydrogen source in fluid communication with hydrogen storage container.

4. The propulsion system of claim 3 wherein said hydrogen source further comprises:
    an aluminum substrate;
    a thin binding layer of hydrogen-absorbing metal deposited on said substrate; and,
    a means for releasing hydrogen from said binding layer.

5. The propulsion system of claim 4 wherein said thin binding layer is made of a palladium material.

6. The propulsion system of claim 4 wherein said thin binding layer is made of a zirconium material.

7. The propulsion system of claim 4 wherein said releasing means further comprises;
    an ionization means and a first voltage source to selectively release said hydrogen from said binding layer;
    a hydrogen collection chamber in fluid communication with said delivery chamber; and
    a second voltage source for applying a voltage difference between said fuel delivery roll and said collection chamber.

8. The propulsion system of claim 7 wherein said ionization means is selected from the group consisting of an electron beam with precisely determined energy and a laser with a particular wavelength.

9. The propulsion system of claim 1 wherein:
    said rotating arm is formed with a second duct to establish a path of fluid communication between said detonation chamber and said delivery chamber; and,
    said axle is formed with a second hole for establishing a path of fluid communication between said delivery chamber and said detonation chamber when said second hole is aligned with said second duct.

10. The propulsion system of claim 9 further comprising an oxygen source in fluid communication with said fuel delivery chamber.

* * * * *